May 27, 1958 D. R. ANDREWS 2,836,714

ELECTRONIC LIMITER CIRCUIT

Filed March 30, 1953

INVENTOR.
Dallas R. Andrews

BY Morris A. Rabkin

ATTORNEY

United States Patent Office 2,836,714

Patented May 27, 1958

2,836,714

ELECTRONIC LIMITER CIRCUIT

Dallas R. Andrews, Collingswood, N. J., assignor to Radio Corporation of America, a corporation of Delaware Application March 30, 1953, Serial No. 345,421

9 Claims. (Cl. 250—27)

This invention relates to electronic limiter circuits, and more particularly to a limiter circuit for eliminating phase shift of pulse signals due to variations in amplitude of the signals.

This invention is disclosed in applicant's copending patent application, Serial No. 264,147, filed December 29, 1951, issued as U. S. Patent No. 2,760,063 on August 21, 1956. As disclosed in the copending patent application, this invention is employed in a system including a trigger circuit for producing a train of uniform gating or synchronizing pulses from a train of non-uniform input pulses. The input pulses of the copending application are half-sinusoidal signals. The trigger circuit is actuated by the application of a predetermined voltage amplitude. However, the input pulses vary in amplitude, and, therefore, the rise and fall of these input pulses vary in slope. As a result, there are phase differences with respect to the start of each of the input pulses in the occurrence of the predetermined voltage amplitude. That is to say, an input pulse of relatively large amplitude rises to the predetermined amplitude in less time than a pulse of smaller amplitude. These phase differences in the occurrence of the predetermined amplitude result in non-uniformity in the spacing between gating pulses produced by the trigger circuit, so that synchronization is impaired.

Accordingly, it is an object of this invention to provide a simple circuit for eliminating phase shift of pulse signals due to variations in amplitude or slope of these signals.

It was recognized that by limiting the amplitude of the input signals a variable amount depending upon the amplitude of the signals, the phase shift may be eliminated.

Therefore, another object of this invention is to provide a simple circuit for variable limiting of pulse signals.

Still another object of this invention is to provide a novel and inexpensive variable limiter circuit that is reliable in operation.

Yet another object of this invention is to provide a simple limiter circuit that may be used to eliminate phase shift of pulse signals.

These and other objects of this invention are achieved by a circuit that includes a diode and a grid-controlled electron tube. The input signals are applied to the grid of the tube, and the resulting changes in potential at a cathode resistor are used to provide a variable positive bias on the cathode of the diode. Changes in anode potential are applied to the cathode of the diode through a capacitor. The diode limits the output to negative polarity voltages which are the difference between the changes in anode potential and the variable bias potential.

Figure 1:
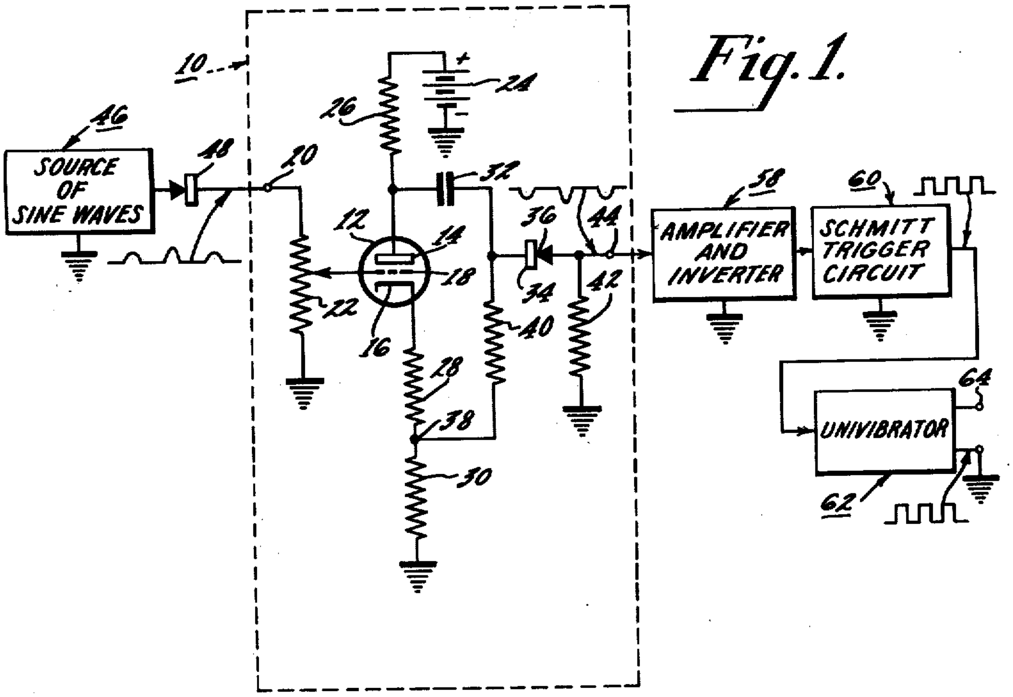
Figure 2:
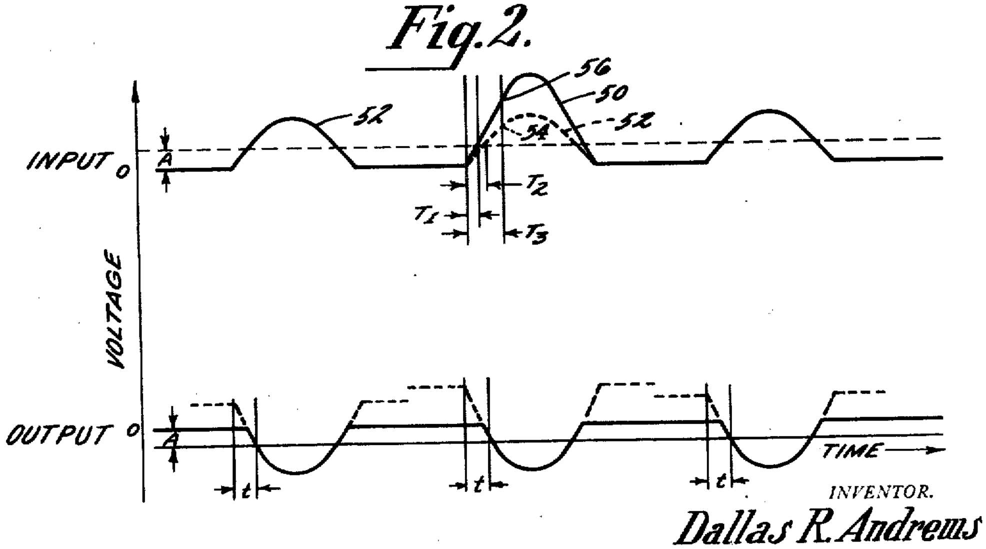

The novel features of this invention as well as the invention itself, both as to its construction and mode of operation, may be better understood from a reading of the following description considered together with the accompanying drawings in which:

Figure 1 is a circuit diagram of an embodiment of this invention incorporated in a system for producing gating pulses; and Figure 2 is a graphical diagram of waveshapes produced at the input and output of a limiter circuit embodying this invention.

Referring now to Figure 1, a limiter circuit 10 embodying this invention is made up of an electron discharge tube 12 having an anode 14, cathode 16 and control grid 18. Input signals are applied to the circuit through an input terminal 20 and a gain-control resistor 22 to the control grid 18 of the tube 12. A source of operating potential 24 is applied to the anode 14 of the tube through an anode resistor 26. A first and a second cathode resistor 28, 30 are connected as a voltage divider between the cathode 16 of the tube and ground. The anode 14 of the tube is coupled through a capacitor 32 to the cathode 34 of a crystal diode 36. The junction 38 of the cathode resistors 28, 30 is connected through a large resistor 40 to the cathode 34 of the crystal diode 36. One end of a load resistor 42 is connected to the anode of the diode 36, and the other end of the resistor 42 is connected to ground. An output terminal 44 is connected to the anode of the diode 36.

For purposes of illustration, the input signals applied to the limiter circuit 10 are shown as coming from a source of sine waves 46. This source 46, as disclosed in the aforementioned copending application, may be a magnetic transducer and amplifier for reading magnetic pulses from magnetic tape (not shown). The sine waves are rectified by a rectifier 48, and applied as positive pulses to the input terminal 20 of the limiter circuit 10. These rectified pulses are shown graphically in Figure 2. The amplitude of the pulses may vary, for example, due to variations in spacing between the magnetic tape and the magnetic reading transducer. As shown in Figure 2, the second pulse 50 has a greater amplitude than the first pulse 52 (shown superposed in broken lines). Due to the differences in amplitude, the rise of the second pulse 50 is steeper than that of the first pulse 52. The second pulse may take a time $T_1$ to rise from zero level to a predetermined intermediate amplitude A while the first pulse takes a greater time $T_2$ for the same rise. Therefore, the time of rise from the start of a pulse to an amplitude A, i. e. the phase of that amplitude, is different with differences of pulse amplitude. These phase differences are eliminated by the limiter circuit embodying this invention, so that a specified amplitude on each output pulse occurs at a specified time after the start of each input pulse.

The tube 12 in the limiter circuit 10 is normally conducting, so that the junction 38 between the cathode resistors 28, 30 is normally above ground potential. This positive potential is applied as a fixed positive bias to the cathode 34 of the crystal diode 36. Since the anode of the diode 36 is normally at ground potential, the diode does not conduct. With the application of a positive pulse to the control grid 18 of the tube, conduction in the tube increases and the potential at the junction 38 of the cathode resistors rises still further following the rise in grid voltage. Thus, a variable bias is applied to the cathode 34 of the crystal diode 36 which is representative of the amplitude of the input signal. At the same time that the junction 38 of the cathode resistors is rising in potential, the anode 14 of the tube 12 drops in potential due to the increased conduction in the tube. The anode resistor 26 is made larger than the second cathode resistor 30 so that this drop in potential at the anode 14 is greater in magnitude than the rise in potential across the second cathode resistor 30. The changes in anode potential are applied through the capacitor 32 to the cathode 34 of the crystal diode 36. The potential at the cathode of the crystal diode falls below ground potential when the decrease in anode potential is greater in magnitude than the fixed bias plus the variable bias. At that time, the diode conducts, and a negative-going output signal is produced. The output pulse then follows the difference between the change in anode potential and the smaller change in potential at the junction of the cathode resistors until the potential at the cathode of the diode rises to ground potential cutting the diode off.

As shown in Figure 2, the negative-going output signals are limited by a variable amount which varies with the amplitude of the input pulse. The variable limiting action is such that an intermediate amplitude level A occurs at the same time with respect to the start of each input pulse; that is to say, there is the same time of rise "$t$" for each pulse from the start of the input pulse (shown in broken lines in the output pulses of Figure 2) until the output pulse reaches the amplitude A.

The effect of the limiter circuit may be appreciated by considering the diagram of the superposed input pulses in Figure 2. Consider a third time period $T_3$, and the points 54, 56 on the first and second pulses 52, 50 at that time. The limiter circuit clips the lower portions of the pulses, i. e. inversely limits them, an amount proportional to the amplitude of the pulse, so that all the points 54, 56 at time $T_3$ have substantially the desired amplitude A in the output pulse. The waveforms and time indications in Figure 2 are exaggerated for purposes of clarity of illustration.

The fixed bias on the cathode of the diode, provided by the voltage drop across the second cathode resistor 30, is desirable. With a fixed bias there is always some clipping of the base line of the input, and thereby low-level noise or spurious signals are eliminated.

Applicant's invention is not restricted in utility to the variable inverse limiting of positive input pulses, as described above. This invention may be readily modified for limiting of negative input pulses. For example, this may be done by reversing the connections of the diode, so that the cathode is connected to the output terminal, and by applying a negatiive bias to the anode of the diode by connecting the second cathode resistor to a negative potential source.

Referring back to Figure 1, the negative output pulses from the limiter circuit 10 are applied to an amplifier and inverter circuit 58 which in turn applies positive pulses of the same waveshape to a Schmitt trigger circuit 60. The outputs of the Schmitt trigger circuit 60, in the form of square-wave pulses, are applied to a univibrator 62 which produces a train of square-wave pulses of uniform duration. These circuits are shown in detail in the aforementioned copending application. A Schmitt trigger circuit is one which has two stable conditions. A voltage having a certain minimum value is required to drive it from one condition to the other. The circuit stays in the condition to which it is driven until the applied voltage is removed or drops to a value below the triggering voltage at which time it returns to its original condition. Thus, when the outputs of the inverter circuit 58 are applied to the Schmitt trigger circuit 60, the triggering voltage on each of the pulses is in a specified phase so that the leading edges of the outputs of the trigger circuit are uniformly spaced where the input signals are uniformly spaced. Where the input signals are not uniform, the leading edges of the outputs start with the same time delay from the start of the input pulses. The univibrator 62 is of the type known as a "one-shot" or "slide-back" flip-flop. The univibrator has two states, one stable and one unstable. When it is keyed by a pulse from the Schmitt trigger circuit 60, the univibrator is shifted from the stable to the unstable state. It then shifts back to the stable state after a period of time determined by the time constants of the circuit. Thus, the univibrator develops a square wave energy of predetermined duration, so that a train of square-wave pulses is produced at the output terminals 64 of the univibrator which are uniform in duration and uniform in spacing or uniform in phase with respect to the start of each of the input pulses. Applicant's invention is not restricted in utility to a gating pulse system as described.

Although it is not intended to limit the invention to any specific circuit parameters, the following components have been found suitable for an embodiment of the invention illustrated in the drawing. The electron tube is type 6C4, and the crystal diode is IN34A. The anode resistor of the tube is 5600 ohms; and the first and second cathode resistors are respectively 330 and 220 ohms. The resistors connected to the diode electrodes are both 27,000 ohms; and the capacitor is .01 microfarad. The amplitude of the input pulses applied to the circuit is of the order of 5 volts, and the output pulses are in phase with each other at an intermediate amplitude A of about 3 volts.

As is evident from the above description, a simple circuit has been shown for variable limiting of pulse signals. This circuit may be used for eliminating phase shift of pulses due to variations in amplitude of the pulses.

What is claimed is:

1. An electronic limiter circuit comprising a unilateral impedance element having anode and cathode electrodes, an input terminal for receiving input pulses of a certain polarity, means coupled to said input terminal and responsive to said input pulses for producing voltage pulses and for producing a variable bias potential of smaller amplitude than said voltage pulses both in accordance with amplitude variations in said input pulses, means for applying said voltage pulses to one of said electrodes, means for applying said variable bias potential to one of said electrodes in a manner tending to bias said impedance element in the reverse direction and to oppose the passage through said unilateral element of a portion of the one of said voltage pulses produced simultaneously with the applied bias potential, and an output load impedance element connected to the other of said electrodes.

2. An electronic limiter circuit as recited in claim 1 wherein said means responsive to said input signals for producing voltage pulses and for producing a variable bias potential in accordance with amplitude variations in said input pulses includes an electron control device having anode, cathode and control electrodes, said control electrode being connected to said input terminal, and separate impedance means respectively coupled to said device anode and cathode electrodes for respectively producing said voltage pulses and bias potential.

3. An electronic limiter circuit comprising an electron control device having anode, cathode and control electrodes, an input terminal coupled to said control electrode for applying input signals thereto, separate impedances connected to said anode and cathode electrodes, means for applying an operating potential across the series combination of said separate impedances and the anode-cathode path of said device, a unilateral impedance element having a plurality of electrodes, means for applying voltage changes produced across said anode and cathode impedances to one electrode of said unilateral impedance element, the applied instantaneous changes being such that they tend to be in opposite canceling directions, and an output terminal connected to another electrode of said unilateral impedance element.

4. An electronic limiter circuit comprising an electron discharge tube having anode, cathode and control electrodes, an input terminal coupled to said control electrode, separate impedance elements connected to said anode and cathode electrodes, means for applying an operating potential across the series combination of said impedance elements and the anode-cathode path of said tube, a unilateral impedance element having a plurality of electrodes, capacitive and resistive means respectively coupling one and the other of said impedance elements to one electrode of said unilateral impedance element to apply to said one electrode in canceling directions voltage changes produced across said impedance elements, and an output terminal connected to another electrode of said unilateral impedance element.

5. An electronic limiter circuit comprising an electron discharge tube having anode, cathode and control electrodes, an input terminal connected to said control electrode, a first resistor connected to said anode, means for applying an operating potential to said first resistor, and second resistor of lower resistance than said first resistor connected to said cathode, means for applying a reference potential to said second resistor, a diode having anode and cathode electrodes, a capacitor coupling said first resistor to the cathode of said diode, a third resistor connecting said second resistor to the cathode of said diode, a fourth resistor connected to the anode of said diode, means for applying a reference potential to said fourth resistor, and an output terminal connected to the anode of said diode.

6. In electronic apparatus wherein an electronic circuit is responsive to a predetermined voltage applied to it for producing output signals, and wherein voltage input pulses which vary in amplitude are applied to said apparatus; the combination with said electronic circuit of means for eliminating in said input pulses variations in phase of the occurrence of said predetermined voltage with respect to the start of each of said pulses, said means comprising a unilateral impedance element having anode and cathode electrodes, an input terminal for receiving said input pulses, means coupled to said input terminal and responsive to said input pulses for applying voltage variations to one of said electrodes and for varying the bias potential of said unilateral impedance element both in accordance with variations in the amplitude of said pulses, a load impedance element connected to the other of said electrodes, and means for coupling said other electrode to said voltage-responsive circuit, whereby said voltage responsive circuit is enabled to produce output signals at substantially the same times after the starts of said input pulses.

7. In an electronic apparatus including, one, means for supplying a train of input pulses that have a certain amplitude at non-uniform times from their respective starts, and, two, an electronic circuit that is operative responsive to a certain pulse amplitude; the combination therewith of, one, means responsive to each of said input pulses for producing another pulse having said certain amplitude at a certain time after the start of the associated input pulse, and, two, means for applying each said other pulse to said electronic circuit; said other pulse producing means comprising a unilateral impedance means having a plurality of electrodes, an input terminal for receiving said input pulses, means coupled to said input terminal and responsive to said input pulses for applying similar pulses to one of said electrodes and for applying a bias potential to said impedance element to oppose said similar pulses, the amplitude of said bias potential varying with the amplitude of said input pulses, and load impedance means connected to another of said electrodes; said other pulse applying means including means coupling said other electrode to said electronic circuit.

8. In an electronic apparatus including, one, means for supplying a train of input pulses that start with certain substantially uniform phase relationships and that are non-uniform in amplitude, two, a first trigger circuit that is operative to produce pulses that start with substantially uniform phase relationships responsive to a certain pulse amplitude, and, three, a second trigger circuit that produces pulses that have substantially uniform durations responsive to said first trigger circuit pulses; the combination therewith of, one, means responsive to each of said input pulses for producing another pulse having said certain amplitudes at a certain time after the start of the associated input pulse, and, two, means for applying each said other pulse to said first trigger circuit; said other pulse producing means comprising a unilateral impedance means having a plurality of electrodes, an input terminal for receiving said input pulses, means coupled to said input terminal and responsive to said input pulses for applying similar pulses to one of said electrodes and for applying a bias potential to said impedance element to oppose said similar pulses, the amplitude of said bias potential varying with the amplitude of said input pulses, and load impedance means connected to another of said electrodes; said other pulse applying means including means coupling said other electrode to said first trigger circuit.

9. The combination as recited in claim 8 wherein said means coupled to said input terminal includes an electron control device having an anode, cathode, and control electrode, said control electrode being coupled to said input terminal, separate impedances coupled to said anode and cathode electrodes, a capacitive coupling between said anode electrode and said one unilateral impedance electrode, and a direct-current connection between said cathode electrode and said one electrode.

References Cited in the file of this patent

UNITED STATES PATENTS

| | | |
|---|---|---|
| 2,178,012 | White | Oct. 31, 1939 |
| 2,259,532 | Nicholson | Oct. 21, 1941 |
| 2,337,005 | Selby | Dec. 14, 1943 |
| 2,353,018 | Duke | July 4, 1944 |
| 2,580,020 | Hammond | Dec. 25, 1951 |